US006880396B2

(12) United States Patent
Rait (10) Patent No.: US 6,880,396 B2
(45) Date of Patent: Apr. 19, 2005

(54) LEVEL INDICATOR HAVING THERMOCHROMIC LEUCODYE INKS

(76) Inventor: Joseph Rait, 2201 3rd Ave., Suite 2604, Seattle, WA (US) 98121

( * ) Notice: Subject to any disclaimer, the term of this patent is extended or adjusted under 35 U.S.C. 154(b) by 0 days.

(21) Appl. No.: 10/697,279

(22) Filed: Oct. 31, 2003

(65) Prior Publication Data

US 2004/0226363 A1 Nov. 18, 2004

Related U.S. Application Data

(63) Continuation-in-part of application No. 10/288,309, filed on Nov. 6, 2002, now Pat. No. 6,761,066, which is a continuation-in-part of application No. 10/077,971, filed on Feb. 20, 2002, now abandoned.

(51) Int. Cl.$^7$ .............................................. G01F 23/00
(52) U.S. Cl. ...................................... 73/295; 73/290 R
(58) Field of Search ............................. 73/290 R, 295, 73/293

(56) References Cited

U.S. PATENT DOCUMENTS

| 3,617,374 A | * | 11/1971 | Hodson et al. ............... 349/19 |
| 3,696,675 A | | 10/1972 | Gilmour |
| 4,358,955 A | * | 11/1982 | Rait ............................. 73/295 |
| 5,323,652 A | | 6/1994 | Parker |
| 5,385,044 A | * | 1/1995 | Thomas et al. ............... 73/295 |
| 5,922,158 A | * | 7/1999 | Culp et al. .................... 156/86 |
| 6,260,414 B1 | | 7/2001 | Brown et al. |

FOREIGN PATENT DOCUMENTS

CA          1177281          11/1984

* cited by examiner

Primary Examiner—Hezron Williams
Assistant Examiner—Rodney Frank
(74) Attorney, Agent, or Firm—Lawrence E. Laubscher, Jr.

(57) ABSTRACT

A level indicator and method is provided which is intimately affixed to the outside surface of the outside wall of a container, for use in the determination of the level of the interface between a liquid and the void volume above it within a container. The level indicator includes a thermochromic leucodye ink layer which has at least one, and usually at least two, leucodye inks. Each of the leucodye inks responds chromatically within a different operating temperature range. In one embodiment, the level indicator vertically extends substantially the height of the container. In an alternative embodiment, the level indicator vertically extends along the height of the container, in the region of the top portion of the container, and at least above the legal safe-fill level of the liquid within the container such that overfilling of the liquid in the container is detectable.

28 Claims, 9 Drawing Sheets

LEVEL INDICATOR HAVING THERMOCHROMIC LEUCODYE INKS

CROSS-RELATED APPLICATION

This application is a continuation-in-part of U.S. patent application Ser. No. 10/288,309 filed Nov. 6, 2002 now U.S. Pat. No. 6,761,066 for "Level Indicator", which is a continuation-in-part of U.S. patent application Ser. No. 10/077,971 filed Feb. 20, 2002 (now abandoned).

FIELD OF THE INVENTION

This invention relates to level indicators, and particularly relates to level indicators for determining the level of the interface between a liquid and the void volume above the liquid within a container.

BACKGROUND OF THE INVENTION

Liquid level measuring devices have been known for many years. Their purpose is to locate the level of a liquid, or to indicate the amount of liquid remaining in a container.

On many occasions, monitoring the amount of a liquid in a container is required. However, direct observation of the liquid level is not always possible or practical. Measurement of the liquid in such containers as pressurized cylinders, sealed containers, cryogenic flasks, and opaque vessels is often difficult. Such measurements are even more troublesome when the liquid within the container is corrosive or potentially toxic or flammable.

Sight glasses and weight scales are some examples of liquid level measuring devices which are commonly employed. Both of these devices suffer from a number of disadvantages. Sight glasses are expensive, and they can crack and break easily. On such occasions where the container is placed outdoors, ultraviolet light can cause the glass to haze. Moreover, sight glasses may crack in cold weather, especially when used with water tanks, and are subject as well to salt scale deposits and the concomitant loss of visibility of the level of liquid in the sight glass. Weight scales are also expensive, and in many instances, measurements provided by weight scales are inexact.

A simple, economical external liquid level gauge which permits a direct reading of the level of a flowable material has been provided by the present inventor in Canadian Patent No. 1,177,281 issued on Nov. 6, 1984. The liquid level measuring device taught therein employs one thermochromatic material which is coated onto a base layer. The base layer is magnetically mounted to the outside surface of the outside wall of the container, and thus the external liquid level gauge can be repeatedly removed and replaced or relocated when necessary.

The theory is that the rate of heat transfer is different between a mass of flowable material and the void volume above it such that for any container with a modest heat conducting capability, the container wall experiences a temperature gradient which is most pronounced at the interface of the contents with the void volume above the contents, and of course below that interface. That is to say, the rate of heat transfer through the wall of a container will be greater where there is a mass of flowable material located in the container than where there is a void volume above the flowable material. In other words, the rate of heat transfer through the container wall changes most abruptly at the level of the interface, and below. Thus, with the use of a thermochromatic material, a vivid color change occurring at the interface, and below, will permit an observer to obtain a direct reading of the level of the flowable material within a container by discerning where the interface is located.

Several other prior art thermochromatic external liquid level gauges are now described. They include GILMOUR U.S. Pat. No. 3,696,675 issued Oct. 10, 1972, which teaches an external liquid level gauge adapted to be permanently affixed to the outside wall of a container for determining the liquid-gas interface within the container. The external liquid level gauge described therein consists of a uniform thermochromatic liquid crystalline material which coats the entire base layer of the gauge such that it is at right angles to the liquid-gas interface. The uniform thermochromatic material covers the entire temperature range to which the container is subjected within an overall range of −20° C. to 250° C. Depending upon the thermochromatic material selected, color changes over a gradient from violet to red can occur in a range as small as 2° C. to one as broad as 150° C. Since the temperature differential across the liquid-gas interface is generally small, on the order of less than 2° C., the change in color is slight across the interface. This is particularly the case when the container is placed outdoors and a large temperature range needs to be covered. As a result, it is difficult to visually locate the liquid-gas interface.

In U.S. Pat. No. 5,323,652 issued Jun. 28, 1994 to PARKER, the inventor teaches a thermochromic level indicator for determining the level of a material inside a container. The thermochromic level indicator includes at least two thermochromic materials of different opacities and transition temperature. Prior to the attachment of the thermochromic level indicator to the outside surface of the outside wall of the container, the thermochromic materials are applied to a transparent film by silk screening, other printing and coating methods, or methods which employ the use of microencapsulated thermochromic materials. The thermochromic level indicator may be permanently adhered to the container wall or it may be adhered to a magnetic strip which can be temporarily affixed to the container wall.

In another U.S. Pat. No. 5,707,590, issued Jan. 13, 1998, the inventor THOMAS et al. has provided a detergent container with a thermochromatic level indicator. In one embodiment of the invention, the thermochromatic substance is added to the container's plastic material during the molding process. In another embodiment of the invention, the level indicator or strip comprises a base material, such as Mylar, which is coated or imbedded with a thermochromatic substance by such methods as painting, stripping, or screen printing.

In yet another U.S. Pat. No. 6,260,414 issued Jul. 17, 2001 to BROWN et al., the inventors teach a cholesteric liquid crystal fluid level indicator that determines the level of a cooled liquid, in particular beer, in a closed, opaque keg, and that indicates whether the beer in the keg is at its ideal temperature for consumption. Specifically, the cholesteric liquid crystal fluid level indicator as taught by BROWN et al. has a liquid crystal composition that produces a color change between a temperature range of 30° F. to 50° F. The inventors therein emphasize that this range is particularly crucial as it is consistent with the temperature of beer so that the level of beer may be readily determined by observing the color change of the cholesteric liquid crystal fluid level indicator. In addition, the cholesteric liquid crystal fluid level indicator produces a predetermined color when the beer is at its ideal temperature for consumption. The liquid crystal composition used in the cholesteric liquid crystal fluid level indicator taught by BROWN et al. is a cholesteric liquid crystal composition or cholesteric/chiral nematic liquid crystal mixture that exhibits at least one color, but preferably three, in a predetermined cooled temperature range. The cholesteric liquid crystal fluid level indicator operates such that when the closed refrigerated environment experiences a slight and sudden change in temperature, such as when the refrigerator door is opened or the compressor turns off, then there will be a specific color display on the indicator from which an observer can determine whether or not the beer within the keg inside the refrigerator is at a suitable temperature for consumption.

It is important to note that the thermochromatic materials employed in the level gauges of all of the foregoing prior art are various forms of cholesteric liquid crystal compositions. As is known to those skilled in the art, cholesteric liquid crystal thermochromics are toxic and unfortunately very difficult to work with as they require highly specialized printing and handling techniques. Typically, silk-screen printing is required for the application of the cholesteric liquid crystal thermochromics onto a desired substrate. Due to the relatively small particle size of the cholesteric liquid crystal thermochromics, fine screen mesh, and thinner lay-down are desirable. Such fine screen printing process is slow and tedious. Further, it increases the manufacturing costs of the level gauge, making it expensive and uneconomical to the consumers. Still further, the type of substrates on which the cholesteric liquid crystal thermochromics may be applied are limited. Moreover, typically any gauge which employs liquid crystal thermochromics must also employ an extra backing layer—usually black—on which the liquid crystal thermochromics are placed.

Another disadvantage of employing the use of cholesteric liquid crystal composition is that cholesteric liquid crystal composition typically has a limited shelf life under normal conditions. Thus, over a long period of time, the performance of the level gauges which are manufactured with such cholesteric liquid crystal compositions may deteriorate. Since the level gauges are applied onto containers which are typically placed outdoors and are subjected to harsh environmental conditions, the life span of a cholesteric liquid crystal composition level gauge may even have a further shortened life span. It has been reported that under long periods of UV light, extremely hot temperature and cold temperatures, aggressive spraying of solvents and other fluidic materials onto the level gauge, and excessive washings, significant deterioration of the performance of the cholesteric liquid crystal compositions is shown. Since accuracy of the level gauge is highly desirable in the determination of the level of the interface between a flowable material and the void volume above it within a container, there is a need to provide a level indicator which is manufactured from a material having a long life span and at the same time can withstand harsh environmental conditions.

Moreover, the level gauges of the foregoing prior art are useful for indicating the amount of materials remaining inside a container, but they are not specifically useful as overfill indicators. Indeed, in many instances, only an approximation of the level of materials inside the container is provided. Since the thermochromatic materials present in the prior art level gauges are not in direct contact with the outside surface of the outside wall of the container, the chromatic response of these thermochromatic materials may be delayed. Furthermore, these prior art level gauges may not provide a prominent color change at the level of the interface, and thus a reading of the level of materials may be inexact.

However, under certain circumstances, it is critical to determine the precise level of the materials inside a container, such as in the case of liquefied propane in pressurized cylinder. In warm weather conditions particularly, hydrostatic pressure exerted by liquefied propane inside the pressurized cylinder may cause the cylinder to explode if the cylinder is overfilled. Thus, in order to prevent undesirable gas venting from overfilled cylinders, the United States National Fire Protection Association (NFPA) has recently mandated a safe-fill level of propane in pressurized cylinders to be at a level which is 80% of the volume of the propane cylinders such that a 20% volume head space is maintained when the pressurized cylinders are full of propane. Due to the new NFPA regulations, float valves are being applied to cylinders so as to prevent overfill. The float valve closes when the propane level reaches a volume of 80% of the container.

Although float valves provide a method of preventing overfilling, they are a costly solution. In order for a float valve to be installed in a cylinder, the structure of the cylinder needs to be altered. While some existing cylinders on the market may be retrofitted with float valves, many other existing cylinders must be discarded, and new cylinders with pre-installed float valves need to be manufactured in order to comply with the new regulation. Furthermore, since a float valve is a mechanical device, it is subject to mechanical failure over a period of time.

As is discussed immediately above, installing float valves to cylinders is a solution to prevent propane overfill. However, these float valves may only be compatible to cylinders used in the United States and Canada, and may not be compatible with cylinders used overseas, in such places as Europe, Asia or South America where propane gas is a commonly used cooking fuel. Moreover, many regions outside of North America may not yet have the same or similar regulations as mandated by NFPA, but insurance companies, local municipalities, and the like, may require overfill indicators in order for certain coverage or licensing regulations to be effective.

In light of the foregoing, there is a need to provide a level indicator which employs a thermochromic composition which is economical, non-toxic and easy to handle, and at the same time provides a distinct and responsive color change when the level indicator is in operation. Furthermore, there is a need to provide a level indicator which can be adapted to any container for determining the level of the materials inside the container, and to detect overfill. Still further, there is a need to provide a level indicator which can be easily installed to a container without having to alter the structure of the container, and without the use of tools during the installation process. Moreover, there is a need to provide a level indicator which can be provided to the user at a relatively low cost.

Quite surprisingly, the present inventor has unexpectedly discovered that by using leucodye inks in the thermochromatic layer, a level indicator may be obtained which obviate the disadvantages of using cholesteric liquid crystals which are used in existing level indicators. Since most leucodye inks are formulated with water, they are virtually odor free, and easier to handle. Furthermore, all of the leucodye inks are non-toxic upon drying, which makes them easy to handle and safe to apply to different types of containers. The costs of leucodye inks compound to liquid crystal thermochromics may be at least several orders of magnitude lower, for the same area coverage. Still further, the leucodye inks can be applied with a number of different printing processes. At the same time, the present inventor is able to provide a level gauge which replicates the optical properties of the cholesteric liquid crystal compositions. The leucodye inks exhibit vivid color changes with only slight changes in temperature.

SUMMARY OF THE INVENTION

It is an object of the present invention to provide a novel level indicator to determine the level of the interface between a liquid and the void volume above the liquid within a container, and which obviates or mitigates at least one of the disadvantages of the prior art.

In accordance with one aspect of the present invention, there is provided a level indicator which is intimately affixed to the outside surface of the outside wall of a container for use in determining the level of the interface between a liquid and the void volume above the liquid within the container.

The liquid has a faster rate of heat transfer than the void volume above it within the container. The liquid is chosen from the group consisting of a liquefied gas, gasoline, a corrosive liquid, a petroleum derived liquid, water, alcohol, an alcoholic beverage, oil, coffee, tea, juice, and milk.

In keeping with the present invention, the container to which the level indicator is intimately affixed to the outside surface of the outside wall may be chosen from the group of containers consisting of pressurized cylinders, open containers, sealed containers, cryogenic flasks and opaque vessels.

The level indicator of the present invention is in the form of an elongated strip, vertically extending along the height of the container. In keeping with the present invention, the level indicator conforms to the contour of the outside surface of the outside wall of the container such that the level indicator is in intimate heat transfer relationship with the outside wall of the container.

The level indicator includes a thermochromic leucodye ink layer which has at least two leucodye inks which are different from one another. The at least two leucodye inks are arranged in at least two regions. Furthermore, each of the at least two regions of leucodye inks is arranged in an individual area upon the outside surface of the outside wall of the container. Each of the leucodye inks responds chromatically within a different operating temperature range. The regions of the at least two leucodye inks are disposed in arrays thereof arranged along the length of the level indicator.

The level indicator of the present invention is structured in such a manner that when the level indicator is in a heat transfer relationship with a heat transfer-inducing agent, at least one of the at least two leucodye inks in the level indicator, in the region of the interface between the liquid and the void volume above it within the container and having an operating temperature range encompassing the temperature of the heat transfer-inducing agent, will exhibit a profound color change responsive to heat transfer between the heat transfer-inducing agent and the liquid so as to permit the level of the interface to be detected. Typically, the heat transfer-inducing agent is chosen from the group consisting of hot air, cold air, steam, hot liquid, cold liquid.

In an embodiment of the present invention, the level indicator vertically extends along the height of the container, at least in the region of the top portion of the container, and at least above the legal safe-fill level of the liquid within the container such that overfilling of the liquid in the container is detectable.

The level indicator of the present invention may also include a layer of base material which is intimately affixed to the outside wall of the container, and is such that it is in intimate heat transfer relationship with the outside wall of the container. The thermochromic leucodye ink layer overlies the layer of base material.

The layer of base material is applied to the outside wall of the container by an application method chosen from the group consisting of permanently securing the base material to the outside surface of the outside wall of the container, and removably securing the base material to the outside surface of the outside wall of the container when the base material additionally has adhesive or magnetic properties so as to permit the level indicator to be repeatedly removed and reattached to the outside wall of the container.

When the layer of base material is directly applied to the outside wall of the container, the at least two leucodye inks have been applied to the base material by an application method chosen from the group consisting of painting, silk screening, offset lithography, flexography, gravure, stencilling, crayon transfer, pencil transfer, screening, and combinations thereof.

Typically, but not necessarily, the base material has a series of indicia printed thereon, and the indicia are vertically positioned along the length of the base material and at predetermined spaced-apart locations. The indicia on the base material remain invisible until such time when at least a portion of one of the at least two leucodye inks of the thermochromic leucodye ink layer becomes activated. When activated, that portion of one of the at least two leucodye inks becomes translucent, so as to reveal at least one of the indicia printed on the base material.

In one embodiment of the present invention, the base material has light absorbing properties.

In another embodiment of the invention, the thermochromic leucodye ink layer further includes a light absorbing background upon which the at least two regions of leucodye inks are arranged.

In still another embodiment of the invention, the at least two leucodye inks are directly applied to the outside surface of the outside wall of the container. Each of the at least two leucodye inks is directly applied to the outside surface of the outside wall of the container by an application method chosen from the group consisting of painting, silk screening, offset lithography, flexography, gravure, stencilling, crayon transfer, pencil transfer, screening, and combinations thereof. Furthermore, each of the at least two leucodye inks is carried to the outside surface of the outside wall of the container by a transfer medium. The transfer medium may be chosen from the group of formulations consisting of solvent-based, water-based, plastisol, UV formulations, and combinations thereof. In this particular embodiment, at least a portion of the outside surface of the outside wall of the container which underlies the level indicator has been treated by an application method chosen from the group consisting of anodizing, anti-oxidizing, rust-proofing, and combinations thereof, so as to provide at least that portion of the outside surface of the outside wall with a light absorbing property, prior to the direct application of the level indicator to the outside surface of the outside wall of the container.

Still further, the level indicator may include a protective lamina which overlies the at least two leucodye inks. Typically, but not necessarily, the protective clear lamina is an ultraviolet filter.

Typically, the leucodye inks have previously been combined with standard ink components. Further, at least two leucodye inks in the array have overlapping temperature ranges.

The regions of leucodye inks are arranged on the outside surface of the outside wall of the container chosen from the group of arrays consisting of one of the regions of leucodye ink vertically positioned down the center of the level indicator and at least one other region diagonally positioned on each side of the vertically positioned region of the level indicator, all of the regions of leucodye inks vertically positioned upon the level indicator, and all of the regions of leucodye inks horizontally positioned upon the level indicator.

In a particular embodiment of the present invention, the at least two adjacent regions of leucodye inks are arranged to form a set, and the set is disposed vertically along the length of the level indicator in a repeated manner.

Another aspect of the present invention is to provide a method of determining the level of the interface between a liquid and the void volume above it within a container using a level indicator. The level indicator would be, of course, as described above. The method comprises the steps of:

(i) inducing heat transfer with the heat transfer-inducing agent between the level indicator and the liquid within the container; and (ii) discerning visually a color change in the at least one region of the array of the level indicator.

The region noted above which responds chromatically to a temperature change is contiguous to the liquid within the container at the interface between the liquid and the void volume above it within the container. Specifically, step (i) may be achieved by any of the steps chosen from the group of steps consisting of:

(a) spraying a fluidic material onto the outer surface of the level indicator;

(b) wetting the outer surface of the level indicator, with a moistened cloth or sponge;

(c) pouring a fluidic material down the outer surface of the level indicator;

(d) trickling a fluidic material down the outer surface of the level indicator; and (e) applying an electrically energized source along the length of the level indicator.

In one embodiment of the present invention, the fluidic material as employed above in any of steps (a) through (d) is a heat source. Since the temperature of the fluidic material is above the temperature of the liquid within the container, heat transfer is induced from the fluidic material to the liquid.

In another embodiment of the present invention, the liquid as employed above in any of steps (a) through (d) is a heat sink. Here, the temperature of the fluid material is below the temperature of the liquid within the container. Thus, heat transfer is induced to the fluidic material from the liquid within the container.

In yet another embodiment of the present invention, at least two adjacent regions of the level indicator are arranged to form a set, which comprises the at least two leucodye inks. The set is disposed vertically along the length of the level indicator in a repeated manner.

Particularly when a plurality of sets are disposed in a repeated manner vertically along the length of the level indicator, the method of determining the level of the interface between the liquid and the void volume above it within a container may also further comprise the step of:

(iii) estimating the level of the interface between the liquid and the void volume above the liquid within the container using the level indicator where the estimated area falls between a level having a profound color change and a level having a faint color change.

These and other objects of the present invention are discussed in greater detail hereafter, in association with the accompanying drawings.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

Figure 1:
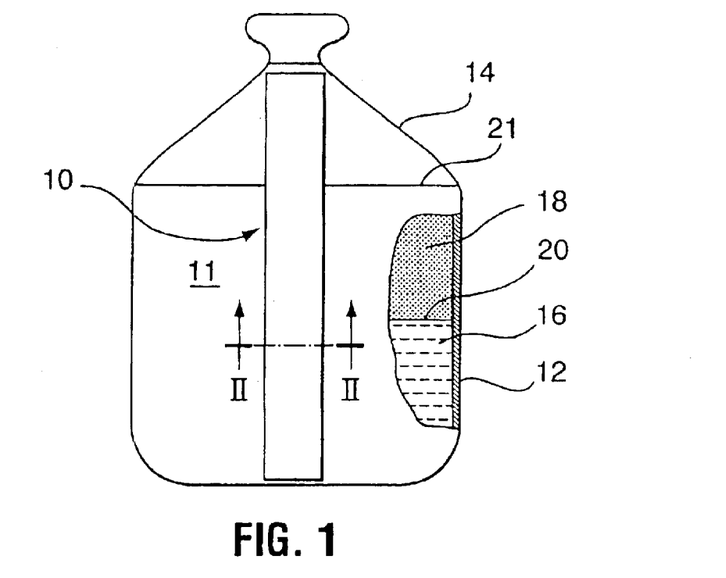
FIG. 1 is a front view of a first embodiment of a level indicator in keeping with the present invention, when intimately affixed to the outside surface of the outside wall of a container.

Referring first to FIG. 1, a level indicator in accordance with a first embodiment of the present invention is indicated generally at 10. Level indicator 10 is intimately affixed to the outside surface 11 of the outside wall 12 of the container 14, and it is in the form of an elongated strip. In this first embodiment, level indicator 10 vertically extends along substantially the entire height of container 14, in the vicinity between the bottom end of container 14 to the top end of container 14. Furthermore, level indicator 10 conforms to the contour of the outside surface 11 of the outside wall 12 of the container 14 such that level indicator 10 is in intimate heat transfer relationship with the outside wall 12 of the container 14.

Container 14 is shown as being partially filled with a liquid 16. The liquid 16 is in intimate contact with the interior surface of wall 12. A void volume 18 is above the interface 20 of liquid 16.

The liquid 16 within container 14 has has a faster rate of heat transfer than void volume 18 above it. An example of liquid 16 within container 14 may be liquefied propane. Other liquids 16 that may be found within container 14 are water, alcohol, alcoholic beverage, oil, coffee, tea, juice, milk, corrosive liquids, petroleum derived liquids, liquefied gases such as carbon dioxide.

It is noted that container 14 to which level indicator 10 is intimately affixed to the outside surface 11 of the outside wall 12 may be a pressurized cylinder, an open container, a sealed container, a cryogenic flask, and an opaque container.

Figure 2:
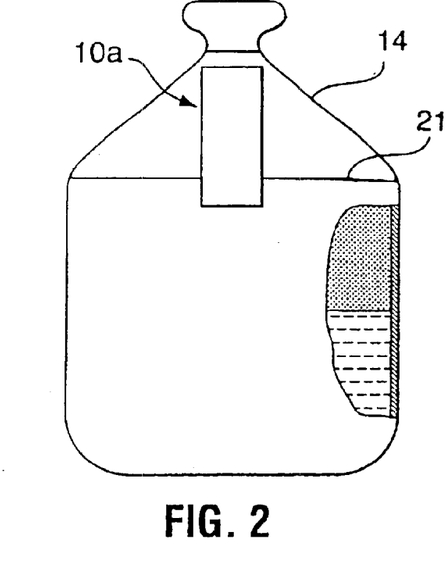
FIG. 2 is a front view of a second embodiment of a level indicator in keeping with the present invention, when intimately affixed to the outside surface of the outside wall of a container.

While the foregoing embodiment discussed with FIG. 1 refers to a level indicator 10 which vertically extends substantially along the height of the container 14, in the vicinity between the bottom end of the container 14 to the top end of container 14, for use in determining the level of the interface 20 between the liquid 16 and the void volume 18 above the liquid 16 within the container 14, an alternative embodiment of a level indicator 10a is shown in FIG. 2. Level indicator 10a vertically extends along the height of the container, in the region of the top portion of the container 14. Level indicator 10a primarily functions as an overfill level indicator.

Typically, the legal safe-fill level 21 of flowable material 16 within container 14 is identified by a mark on the outside wall 12 of container 14. For purpose of explanation herein, the legal safe-fill level 21 is shown as a solid line on the outside wall 12 of container 14. In order for level indicator 10a to detect whether or not liquid 16 in container 14 is at a level beyond the legal safe-fill level 21, level indicator 10a vertically spans the height of container 14 such that level indicator 10a extends at least in the region of the legal safe-fill level 21. In the case of liquefied propane in pressurized container, for example, the legal safe-fill level 21 is typically located at a level which is 80% of the volume of the container, and as such, a 20% volume head space is provided in the container.

Figure 3:
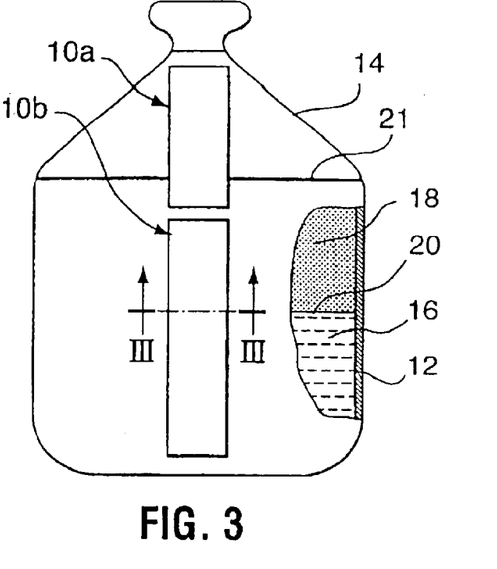
FIG. 3 is a front view of a third embodiment of a level indicator in keeping with the present invention, when intimately affixed to the outside surface of the outside wall of a container.

Another embodiment of a level indicator 10b is shown in FIG. 3. Since level indicator 10b vertically extends along the height of the container 14, in the region below the legal safe-fill level 21, level indicator 10b is not specifically used as an overfill level indicator. Level indicator 10b is primarily used to indicate the amount of liquid 16 inside container 14. However, as can be seen in FIG. 3, level indicator 10b can be used in conjunction with level indicator 10a such that overfilling of liquid 16 in container 14 can be detected.

For purpose of explanation, level indicators identified in FIGS. 2 and 3 with reference characters 10a and 10b respectively are collectively referred to hereinafter as level indicator 10.

Figure 4:
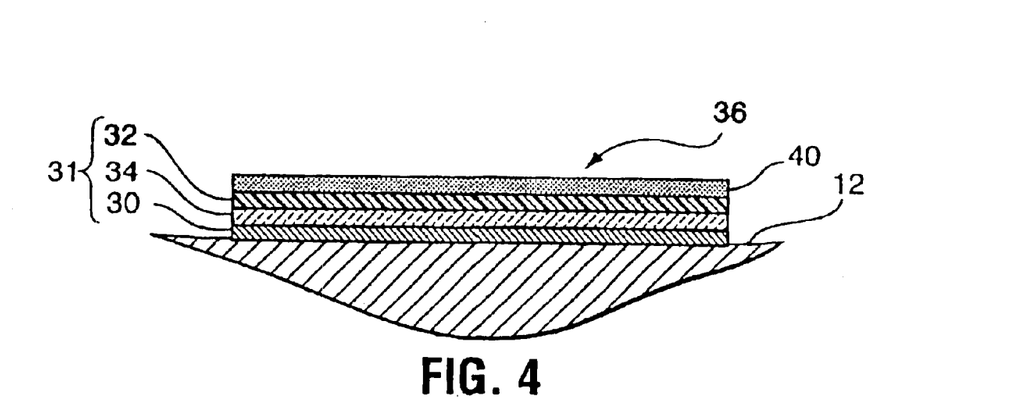
FIG. 4 is a transverse sectional view taken on line II—II of a first embodiment of the level indicator in keeping with the present invention as shown in FIG. 1, greatly enlarged.

Turning now to FIG. 4, a transverse sectional view taken on line II—II of a first embodiment of a level indicator 10 is shown. Level indicator 10 comprises a layer of base material 30 and a thermochromic leucodye ink layer 31 which overlies the layer of base material 30. The base layer 30 is intimately affixed to the outside wall 12 of container 14 in such a manner that it is in intimate heat transfer relationship with the outside wall 12 of container 14. As will be explained in greater detail below, thermochromic leucodye ink layer 31 has at least two leucodye inks 32 which are different from one another, and the at least two leucodye inks 32 are arranged in at least two regions 36 (FIGS. 6 to 9). Furthermore, each of the leucodye inks 32 is arranged in an individual area.

The leucodye inks 32 can be applied to various types of base material 30. Indeed, the base material 30 may be chosen from the group of substrates consisting of paper, plyester, vinyl chloride sheets and plastics.

In one embodiment of the present invention, the layer of base material 30 is applied to the outside wall 12 of container 14 by an application method chosen from the group consisting of removably securing the base material 30 to the outside surface 11 of the outside wall 12 of container 14, and permanently securing the base material 30 to the outside surface 11 of the outside wall 12 of container 14. In the former method, the base material 30 additionally has adhesive or magnetic properties so as to permit level indicator 10 to be repeatedly removed and reattached to the outside wall 12 of container 14.

Typically, but not necessarily, base material 30 has light absorbing properties. In the case of base material 30 without light absorbing properties, however, it is contemplated that thermochromic leucodye ink layer 31 may comprise a light absorbing background 34 upon which the at least two regions 36 of leucodye inks 32 are arranged (FIG. 4). The light absorbing background absorbs any light transmitted through the leucodye ink 32, and allows selectively reflected light to be observed without light interference. Since each leucodye ink 32 responds chromatically within a different temperature range, the selectively reflected light is determined by orientation change of the leucodye ink 32 in response to temperature.

Figure 5:
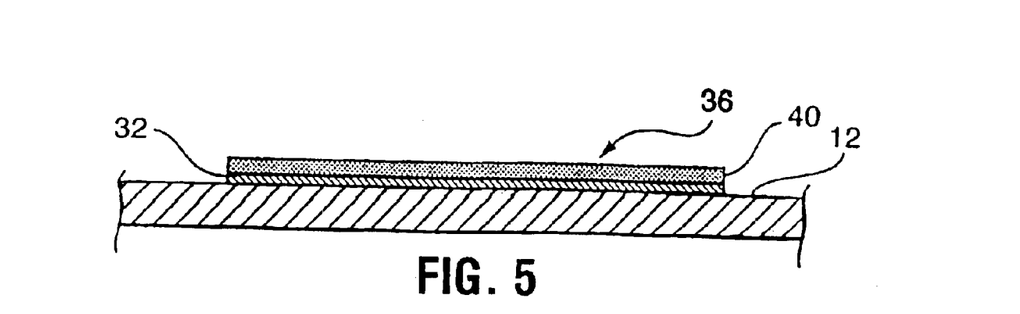
FIG. 5 is a transverse sectional view taken on line II—II of a third embodiment of the level indicator in keeping with the present invention as shown in FIG. 3, greatly enlarged.

In a further embodiment, the at least two leucodye inks 32 are directly applied to the outside surface 11 of the outside wall 12 of container 14 (FIG. 5). In this particular embodiment, at least that portion of the outside surface 11 which underlies level indicator 10 has been treated by an application chosen from the group consisting of anodizing, anti-oxidizing, rust-proofing, and combinations thereof, so as to provide at least that portion of outside surface 11 of outside wall 12 of container 14 with a light absorbing property prior to the direct application of level indicator 10 to container 14. Each of the at least two leucodye inks 32 is directly applied to the outside surface 11 of outside wall 12 of container 14 by an application method chosen from the group consisting of painting, silk screening, offset lithography, flexography, gravure, stencilling, crayon transfer, pencil transfer, screening and combinations thereof. In each of these application methods, each of the at least two leucodye inks 32 is carried to the outside surface 11 of outside wall 12 of container 14 by a transfer medium. The transfer medium chosen for the transferring of each of the at least two leucodye inks 32 to the outside surface 11 of container 14 is such that it does not interfere with the thermochromic response of the transferred leucodye inks 32. Furthermore, an important property of the transfer medium chosen herein is high volatility. Thus, the transfer medium may be evaporated quickly once each of the at least two leucodye inks 32 is delivered to the outside surface 11 of the outside wall 12 of the container. The transfer medium may be chosen from the group of formulations consisting of solvent-based, water-based, plastisol, UV formulations, and combinations thereof.

Since each of the leucodye inks 32 is directly applied to the outside surface 11 of outside wall 12 of container 14 in accordance with this particular embodiment of level indicator 10 shown in FIG. 5, the accuracy of level indicator 10 is significantly increased in comparison to those indicators which require a base layer 30 to magnetically adhere or permanently adhere to the outside surface 11 of the outside wall 12 of the container 14. Here, without the presence of the base layer, the thermal mass of the level indicator 10 is reduced. Thus, the chromatic response of the leucodye inks is expedited, and the color change at the level of the interface 20 between the mass of liquid 16 and the void volume 18 above it within the container 14 is also significantly more pronounced.

However, in certain circumstances, due to the particular nature of the outside surface 11 of the outside wall 12 of the container 14, direct application of leucodye inks 32 onto the outside surface 11 of the outside wall of the container 14 may not be feasible. Thus, a layer of base material 30 is directly applied to the outside wall 12 of container 14, and the at least two leucodye inks 32 are applied to the base material 30 by an application method chosen from the group consisting of painting, silk screening, offset lithography, flexography, gravure, stencilling, crayon transfer, pencil transfer, screening, and combinations thereof.

Typically, but not necessarily, level indicator 10 may also include a protective clear lamina 40 which overlies the at least two leucodye inks 32. Preferably, the protective clear lamina 40 is an ultraviolet filter. The additional ultraviolet filter layer 40 may prevent the deterioration of the level indicator 10. It has been reported that long and continuous exposure to ultraviolet radiation causes the leucodye inks 32 to deteriorate and lose their temperature responsive chromatic characteristic which is necessary for the purpose of utilization as a level indicator as described herein. This is particularly the case when the container 14 is placed outdoors where it is subjected to sunlight for a long period of time.

As have been noted in the prior art references, the existing level indicators currently available in the market employ cholesteric liquid crystals in the thermochromic compositions. These liquid crystal thermochromics are unfortunately very difficult to work with as they require highly specialized printing and handling techniques. The present inventor has unexpectedly discovered that by using leucodye inks in the thermochromic layer, a level indicator may be obtained which obviate the disadvantages of using cholesteric liquid crystals which are used in existing level indicators. Since most leucodye inks are formulated with water, they are virtually odor free. Furthermore, all of the leucodye inks are non-toxic upon drying, which makes them easy to handle and safe to apply to different types of containers. In some instances, the leucodye inks change from one color to another at various temperature ranges. In other instances, the leucodye inks may change from colored to clear. The latter transition may be achieved by combining a leucodye with a permanent-colored ink formulation. For example, a green ink formulation may be obtained by adding a blue leucodye to a yellow ink. In its cool state, the printed ink layer is green, and once warmed reverts to yellow as the leucodye becomes clear or translucent. At the same time, the present inventor is able to replicate the optical properties of crystals. The leucodye inks exhibit vivid color changes with only slight changes in temperature. Also, as noted, leucodye inks do not require the placement of an additional contrast layer on which they may be printed, as opposed to liquid crystal thermochromics which require a black contrast layer on which the liquid crystal thermochromic layer is silk screened. The shelf life of liquid crystal thermochromics is short compared with that of leucodye inks.

The leucodye inks 32 cover the entire temperature range to which container 14 is subjected, within an overall range of −25° C. to 66° C. Each leucodye ink 32 responds chromatically within a different operating temperature range. Furthermore, each of the leucodye ink 32 displays a color gradient within its operating temperature range. Depending upon the leucodye ink 32 selected, color changes over a gradient can occur in a range as small as 2° C. For a leucodye ink 32 with a large operating temperature range, the color difference across the interface 20 is small.

As noted above, the rate of heat transfer is different between the liquid 16 and the void volume 18 above it such that for any container 14 with a modest heat conducting capability, the container wall 12 experiences a temperature gradient which is most pronounced at and below the interface 20 between the liquid 16 and the void volume 18 above it within a container 14. In other words, the temperature of the container wall 12 changes most abruptly at and below the level of the interface 20.

In particular, the level indicator 10 of the present invention is structured in such a manner that when the level indicator 10 is in a heat transfer relationship with a heat transfer-inducing agent, at least one of the at least two leucodye inks 32 is the level indicator 10, in the region of the interface 20 between the liquid 16 and the void volume 18 above it within the container 14 and having an operating temperature range encompassing the temperature of the heat transfer-inducing agent, will exhibit a profound color change responsive to heat transfer between the heat transfer-inducing agent and the liquid 16 so as to permit the level of the interface 20 to be detected. Typically, the heat transfer-inducing agent is chosen from the group consisting of hot air, cold air, steam, hot liquid, cold liquid.

In an outdoor environment, the container 14 may be subjected to varying temperature, from below 0° C. to over 37.8° C. In that particular case, five to seven different leucodye inks 32 in the level indicator 10 are employed where each leucodye ink 32 has an operating temperature range of about 8° C. In more stable environments such as a residence or an office—or even in stores, warehouses, and factories—where temperatures often fall between 16° C. to 29° C., two to five leucodye inks 32 are most effective. In such environments where temperatures range from about 16° C. to 27° C., two leucodye inks 32 with an operating temperature range of about 8° C. or five leucodye inks 32 with each having an operative temperature range of about 3° C. may also be effectively employed.

Moreover, the operating temperature ranges of at least two leucodye inks 32 of level indicator 10 may be overlapped. A temperature response may be invoked from two leucodye inks 32 in the level indicator 10, thus making the level of the interface 20 between the liquid 16 and the void volume 18 above it within a container 14 easier to observe. For instance, the upper operating temperature of one leucodye ink 32a may be 10° C., the temperature differential across the interface 20 may be 2° C., and the temperatures of the liquid 16 and the void volume 18 above it within the container 14 may be 9° C. and 11° C. respectively. On such occasion, a color change occurs for the end of the leucodye 32a which responds to the lower operating temperature range while a color change also occurs for the adjacent end of the leucodye ink 32b which responds within the higher operating temperature range. In order to determine the level of the interface 20, readings of both leucodye inks 32a and 32b are necessary. If two leucodye inks 32 having overlapping operating temperature ranges are employed, the level may be readily discerned visually.

Turning now to FIGS. 6 through 9, the regions 36 of at least two leucodye inks 32 are disposed in arrays thereof, designated by reference numerals 50, 52, 54 and 56.

Each of the leucodye inks 32 is arranged upon at least that light absorbing portion of the outside surface 11 of the outside wall 12 of the container 14 in an individual area which may have any of the following geometric configurations such as dots, circles, stars, squares, triangles, arrows, semi-circles, pentagons, hexagons, digits, and letters.

Figure 6:
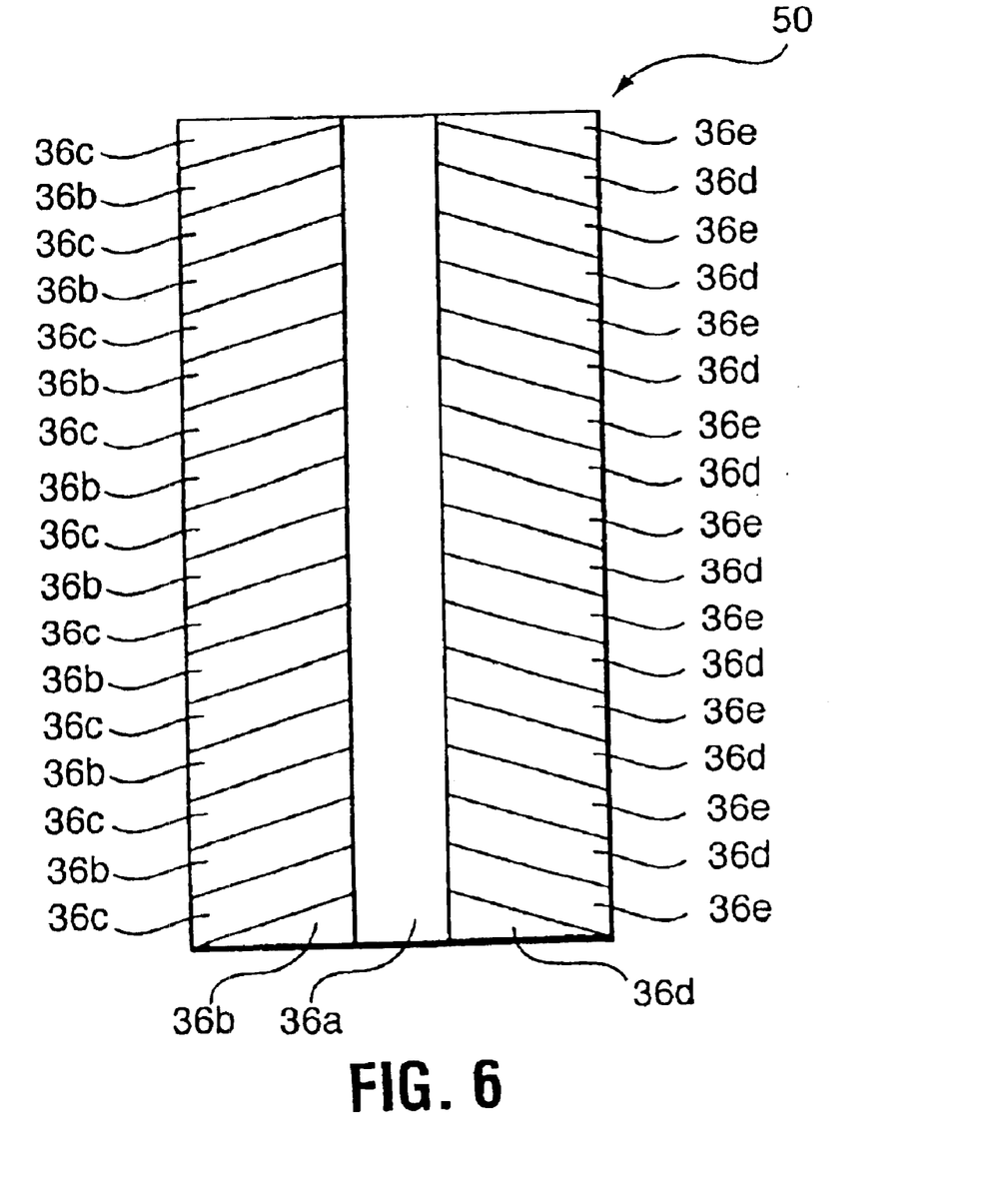
FIG. 6 is a front view of the thermochromic array of a first embodiment of the level indicator in keeping with the present invention.

As can be seen in FIG. 6, the thermochromatic array 50 comprises five leucodye inks 32a, 32b, 32c, 32d, and 32e which are arranged in respective regions 36a, 36b, 36c, 36d, and 36e. The region 36a is positioned vertically down the center of array 50. Regions 36b and 36c are arranged on one side of the vertically positioned region 36a while regions 36d and 36e are arranged on the other side of region 36a. The four regions 36b, 36c, 36d and 36e are arranged in a diagonal manner, repeatedly over the length of array 50. Leucodye ink 32a has the lowest operating temperature range of the group of leucodye inks 32 found in array 50 while leucodye inks 32b and 32c have the next two highest operating temperature ranges, and leucodye inks 32d and 32e have the two most highest operating temperature ranges. It is preferred that the leucodye ink 32a with the lowest operating temperature range exhibits a "cool" color such as blue and the leucodye inks 32e with the highest operating temperature range exhibits a "hot" color such as red to aid in the locating of the interface 20 between the liquid 16 and the void volume 18.

For outdoor use, five leucodye inks 32a, 32b, 32c, 32d and 32e, each responding within a different temperature range, preferably of about 8° C., are chosen such that the full range of all the operating temperature ranges covers the range of temperatures to which array 50 may be most likely exposed.

The upper temperature of leucodye ink 32a may slightly overlap the lower limit of the operating temperature range of leucodye ink 32b, and so on with each additional leucodye ink 32 within array 50 sequentially to the leucodye ink 32e which has the highest operating temperature range. For instance, by using this overlap system, a color change occurs in two adjacent leucodye inks 32a and 32b when the temperature at the interface 20 bridges the two leucodye inks 32a and 32b. Thus, the interface 20 is readily discerned visually.

When the level indicator 10 is placed indoors where the atmosphere is often controlled and potential temperature variations are generally much smaller than outdoors, the leucodye inks 32 in the array 50 may be chosen such that they have operating temperature ranges within the possible outer limits for leucodye inks 32 but also such that they have operating temperature ranges as small as 3° C.

Figure 7:
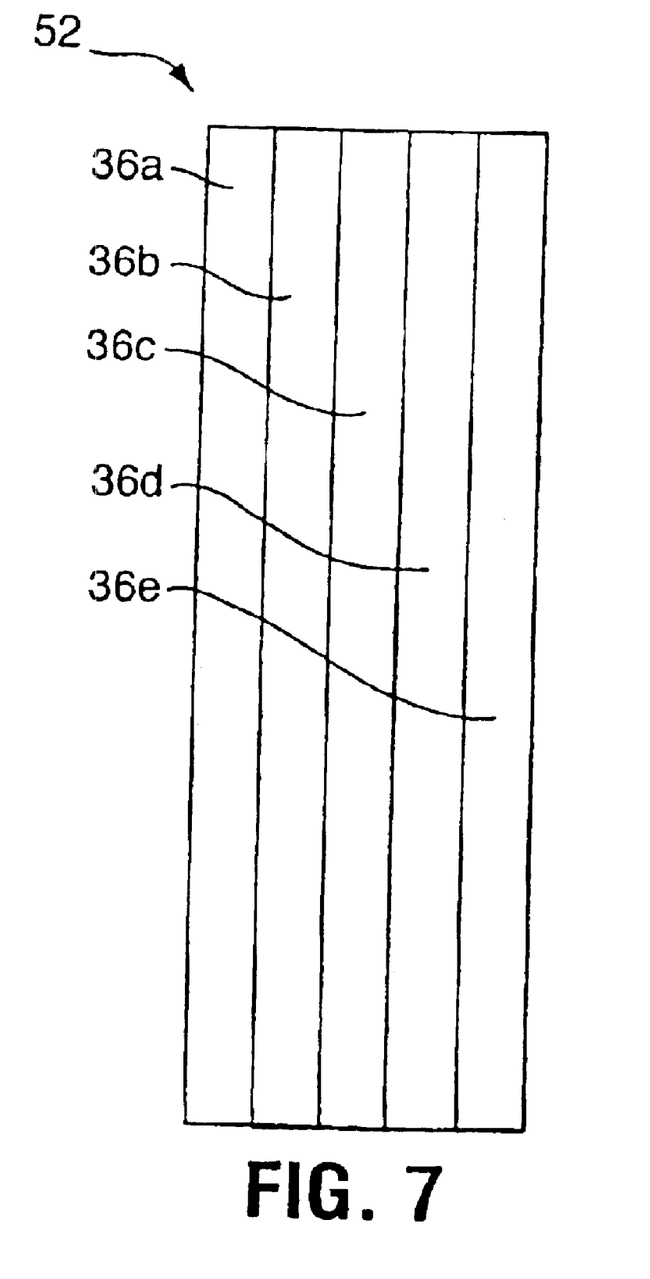
FIG. 7 is a front view of the thermochromic array of a second embodiment of the level indicator in keeping with the present invention.

Referring now to FIG. 7, a different embodiment of the present invention is shown. Thermochromatic array 52 comprises five leucodye inks 32a, 32b, 32c, 32d and 32e which are arranged in respective regions 36a, 36b, 36c, 36d and 36e vertically upon at least that light absorbing portion of the outside surface 11 of the outside wall 12 of the container 14.

Figure 8:
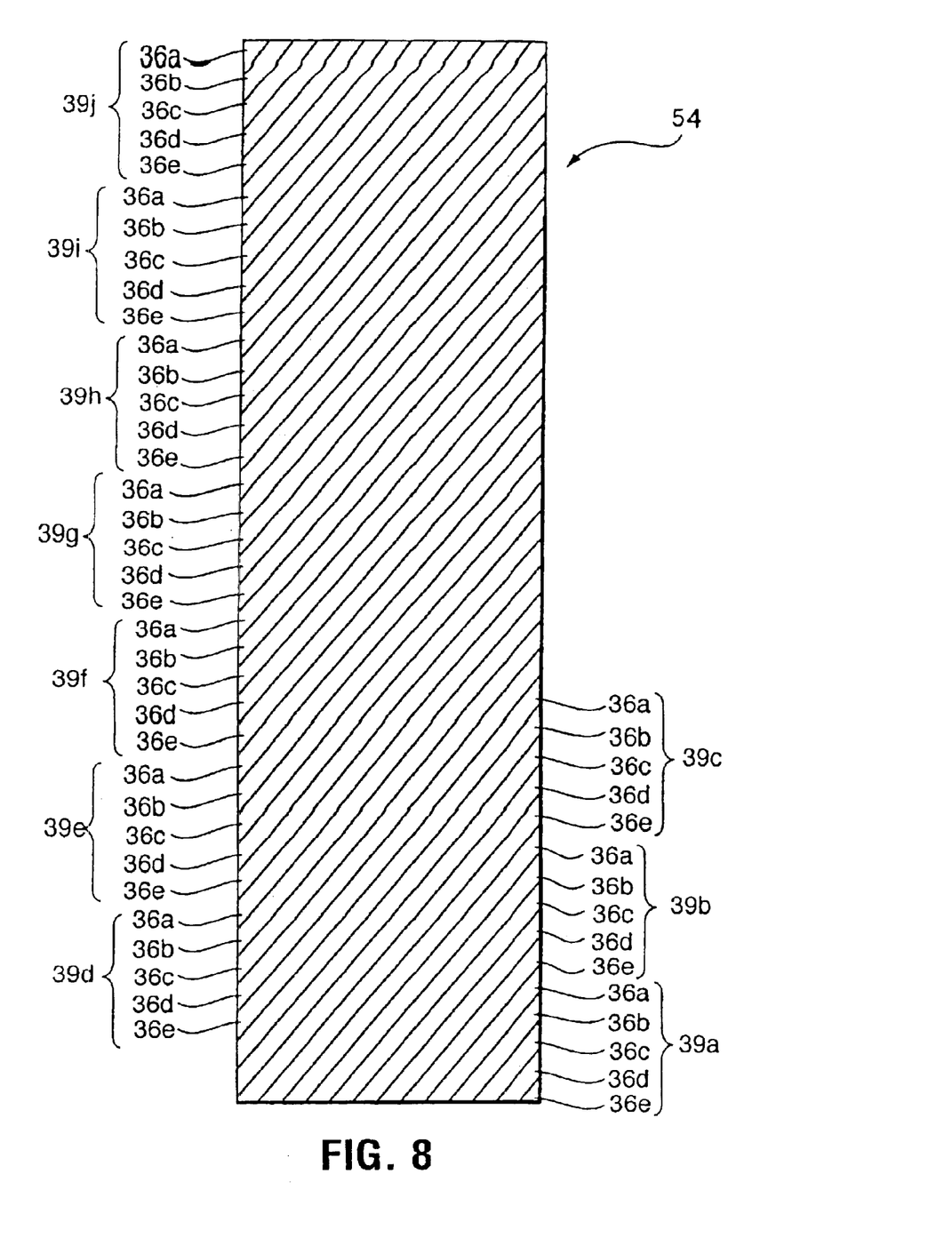
FIG. 8 is a front view of the thermochromic array of a third embodiment of the level indicator in keeping with the present invention.

In another embodiment of the present invention shown in FIG. 8, the thermochromatic array 54 comprises five leucodye inks 32a, 32b, 32c, 32d and 32e which are disposed along at least that light absorbing portion of the outside surface 11 of the outside wall 12 of the container 14 in respective regions 36a, 36b, 36c, 36d, and 36e. Here, the regions 36a, 36b, 36c, 36d and 36e are arranged in a diagonal manner, repeatedly over the entire length of array 54. The angle along the longitudinal axis of array 54 that the diagonal regions 36a, 36b, 36c, 36d and 36e are disposed may vary, but is preferably 45°. As can be seen particularly in FIG. 8 and the following FIG. 9, at least two adjacent regions 36 are combined to form a set 39 and a plurality of such sets 39 are disposed in a repeated manner vertically along the length of the level indicator 10.

Figure 9:
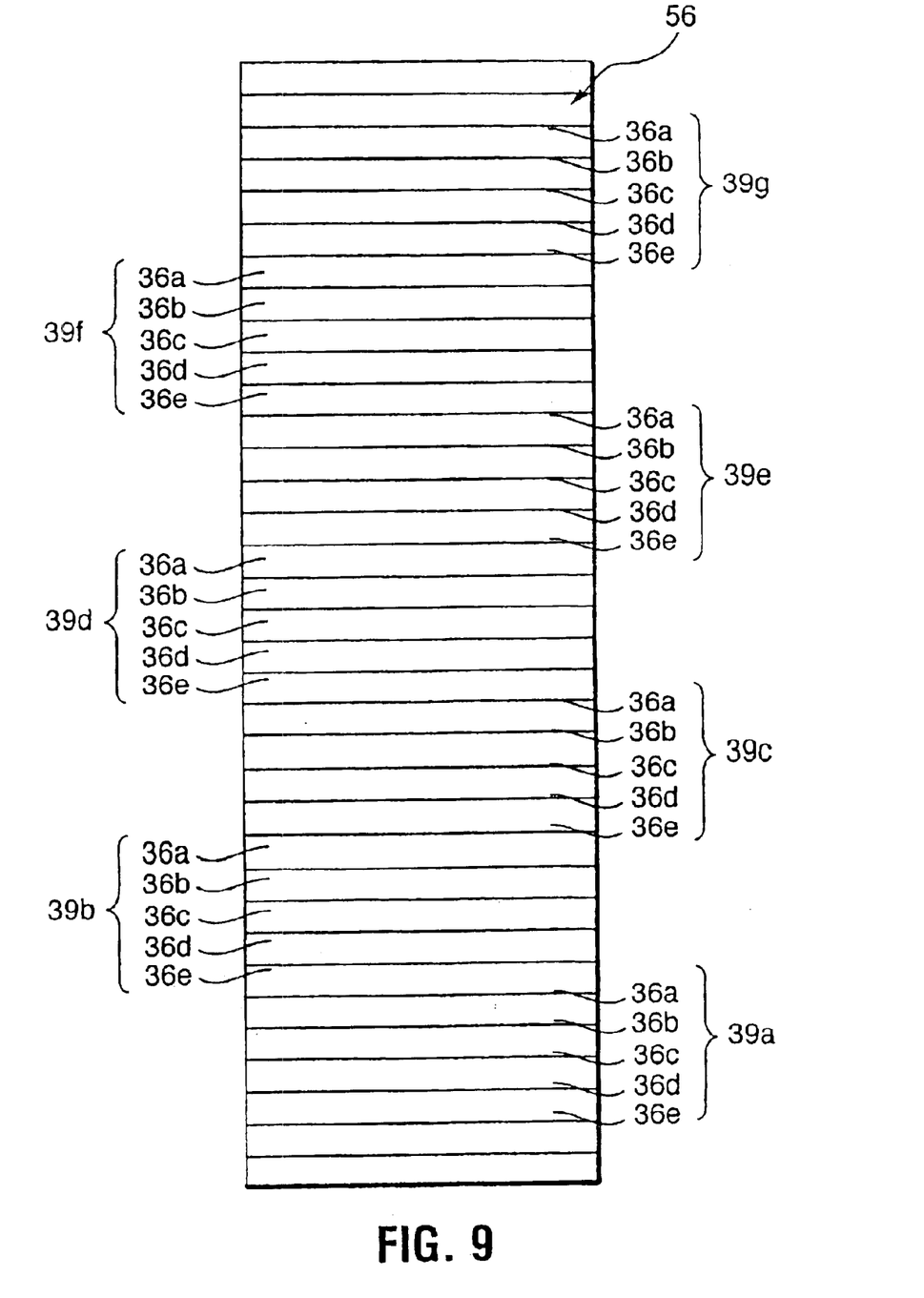
FIG. 9 is a front view of the thermochromic array of a fourth embodiment of the level indicator in keeping with the present invention.

In yet another embodiment of the present invention shown in FIG. 9, the regions 36a, 36b, 36c, 36d and 36e comprising leucodye inks 32a, 32b, 32c, 32d and 32e respectively of array 56 are arranged in a horizontal manner. As noted above, the five regions 36a, 36b, 36c, 36d and 36e combine to form a set 39 and a plurality of such a set 39 are disposed along the length of array 56.

Figure 12:
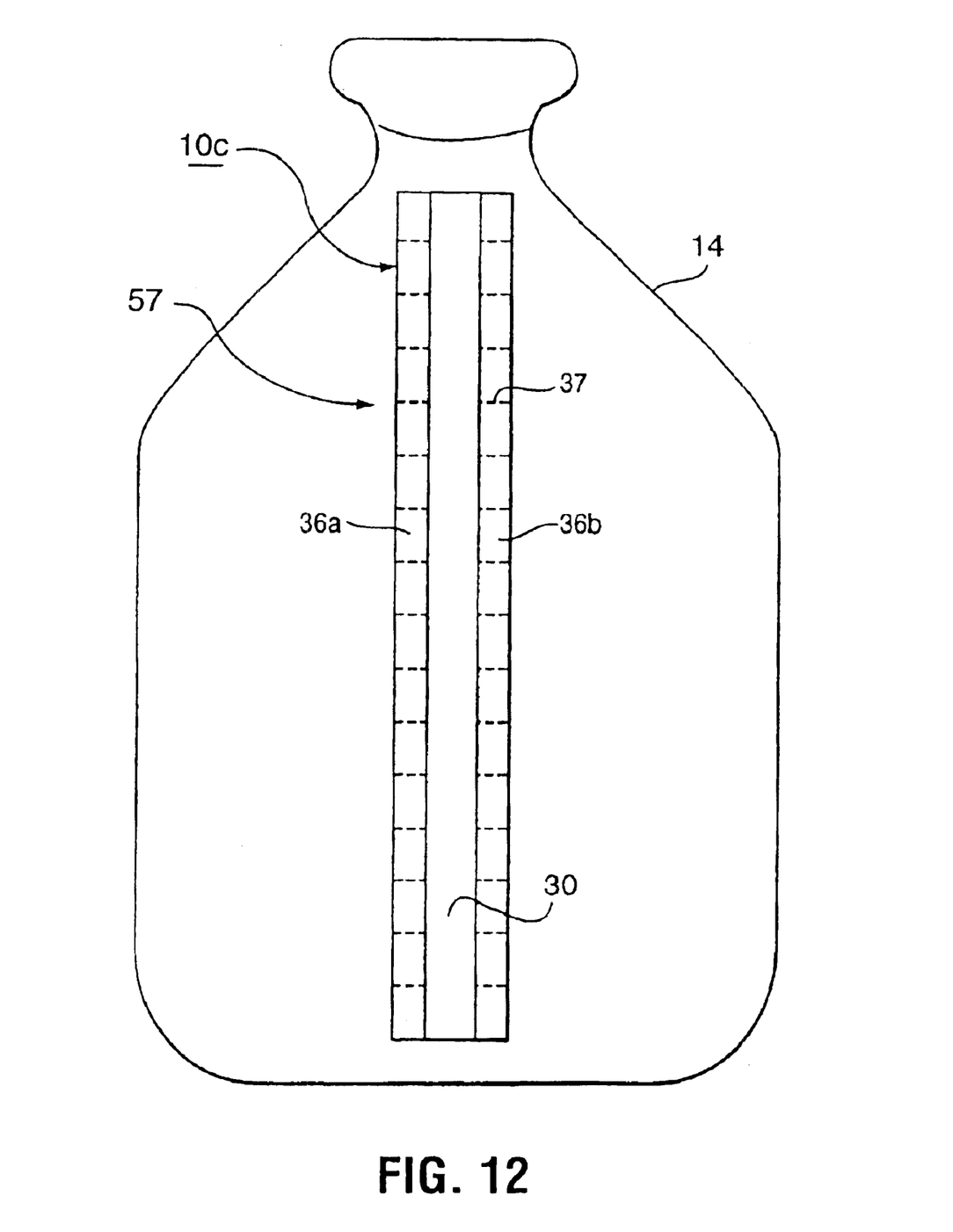
FIG. 12 is a front view of the thermochromic array of the level indicator in keeping with an alternative embodiment of the present invention, when a substrate is directly applied to the outside surface of the outside wall of the container.

In accordance with another embodiment shown in FIG. 12, base material 30 has a series of indicia 37 printed thereon to aid the user to accurately determine the level of the interface 20. With reference to FIG. 12, the indicia 37 are vertically positioned along the length of base material 30 and at predetermined spaced-apart locations. Similar to the level indicator 10 described above, level indicator 10c includes at least two leucodye inks 32. Each of the at least two regions 36 of leucodye inks 32 is arranged in an individual area upon the base material 30, and each of the leucodye inks 32 responds chromatically within a different operating temperature range. The regions 36 of the at least two leucodye inks 32 are disposed in arrays thereof arranged along the length of the level indicator 10c in the vicinity between the bottom end and the top end of base material 30. Each of the at least two leucodye inks 32 is applied to base material 30 by an application method chosen from the group consisting of painting, silk screening, offset lithography, flexography, gravure, stencilling, crayon transfer, pencil transfer, screening, and combinations thereof. As shown in FIG. 12, the thermochromatic array 57 comprises two leucodye inks 32a and 32b which are disposed along the length of the base material 30 in respective regions 36a and 36b.

It is important to note that the series of indicia 37 on base material 30 underlies the at least two leucodye inks 32, and are shown as ghost lines in FIG. 12. Furthermore, the base material 30 may have light absorbing properties.

Until such time when at least a portion of one of the at least two leucodye inks 32 on the base material 30, when placed on the outside surface 11 of the outside wall 12 of the container 14, becomes activated, the indicia 37 on the base material 30 remain invisible. However, when at least the portion of one of the at least two leucodye inks 32 on the base material 30, which is placed on the outside surface 11 of the outside wall 12 of the container 14, is activated, that at least portion of one of the at least two leucodye inks 32 becomes translucent, so as to reveal at least one of the indicia 37 printed on the base material.

In keeping with the provisions of the present invention, the inventor herein provides a method of determining the level of the interface 20 between the liquid 16 and the void volume 18 above it within a container 14 using a level indicator 10 described above. It is important to note that the level indicator 10 includes at least two leucodye inks 32, and has an outer surface remote from the outside surface 11 of the container 14.

In a steady state ambient environment, it is possible that little or no temperature differential exists at the interface 20 between the liquid 16 and the void volume 18 within the container 14. The addition or withdrawal of thermal energy to or from the container 14 and the liquid 16 is required to cause a temperature differential across the interface 20 to occur, and thus inducing a color change response from the leucodye inks 32 in turn. As noted above, the void volume 18 above the liquid 16 generally absorbs or releases far less thermal energy than the liquid 16, causing a measurable temperature differential at the interface 20.

Thus, the method of determining the interface 20 between the liquid 16 and the void volume 18 first comprises the step of inducing heat transfer between the level indicator 10 and the liquid 16 within the container 14. The occurrence of a temperature differential across the interface 20 will then induce a color change in at least one region 36 of the array of the level indicator 10, allowing the interface 20 to be readily discerned visually. It is important to note that the region 36 which responds chromatically to a temperature change is contiguous to the liquid 16 within the container 14.

Specifically, the first step which involves the induction of heat transfer may be carried out by any of the steps chosen from the group of steps consisting of:

(a) spraying a fluidic material onto the outer surface of the level indicator 10;

(b) wetting the outer surface of the level indicator 10, with a moistened cloth or sponge;

(c) pouring a fluidic material down the outer surface of the level indicator 10;

(d) trickling a fluidic material down the outer surface of the level indicator 10; and (e) applying an electrically energized source along the length of the level indicator.

When the fluidic material as described above is a heat source, the temperature of the fluidic material is above the temperature of the liquid 16 within the container 14, thus heat transfer is induced from the fluidic material to the liquid 16. Indeed, steam from a steam gun may be employed if a large temperature gradient between the heat source and the liquid 16 is desired. On the other hand, when the fluidic material is a heat sink, the temperature of the fluidic material is below the temperature of the liquid 16 within the container 14, thus heat transfer is induced from the liquid 16 to the fluidic material.

Figure 10:
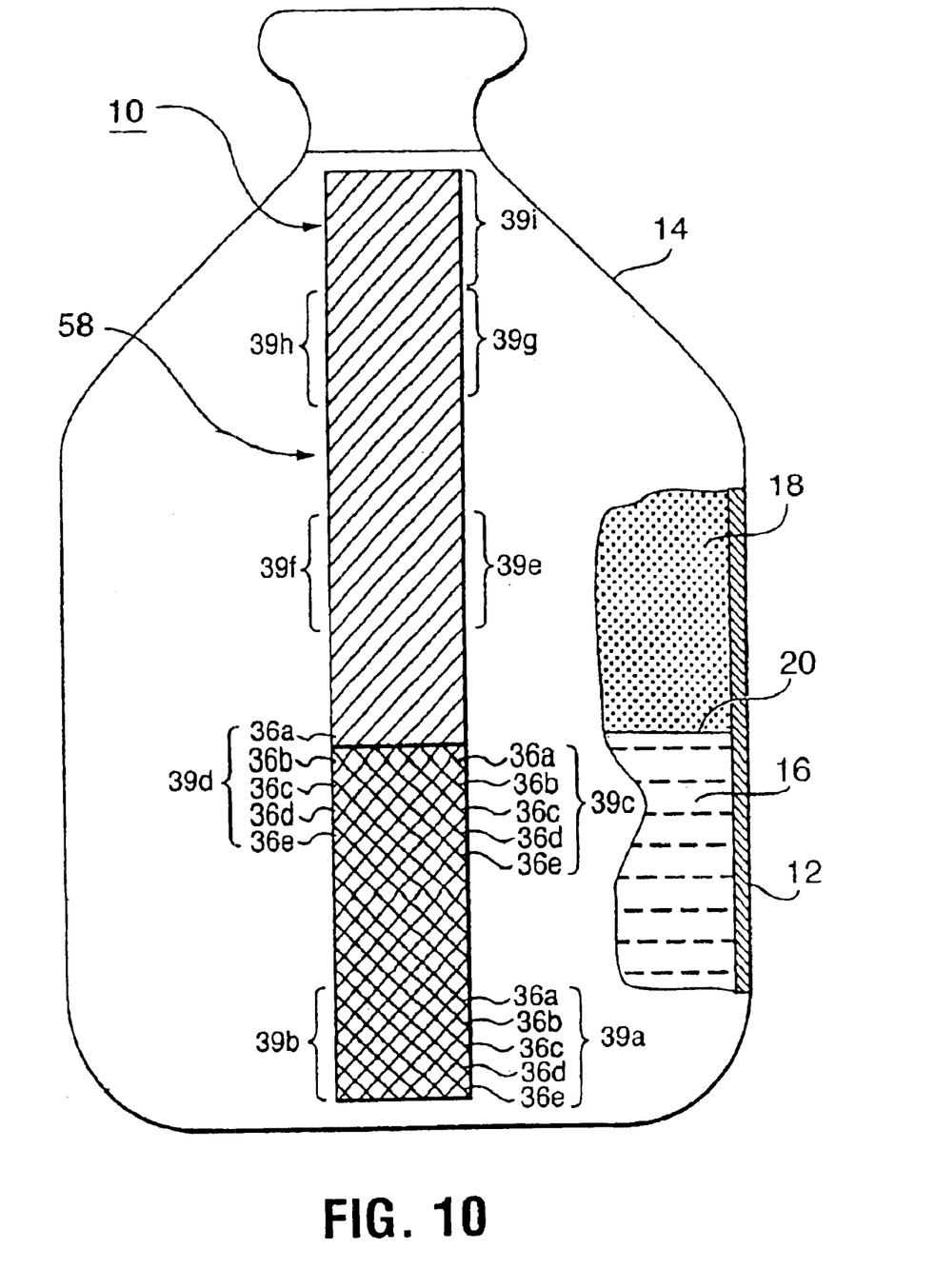
FIG. 10 is a front view of the thermochromic array of a fifth embodiment of the level indicator in keeping with the present invention, when directly applied to the outside surface of the outside wall of the container.

For the purpose of illustration, a large sealed container 14 with a level indicator 10 directly applied to the outside surface 11 of the outside wall 12 is placed in a warehouse or factory where the temperature generally falls between 5° C. and 35° C. The five leucodye inks 32a, 32b, 32c, 32d and 32e of the level indicator 10 are arranged in respective regions 36a, 36b, 36c, 36d and 36e as shown in array 58 with reference to FIG. 10. The operating temperature ranges of regions 36a, 36b, 36c, 36d and 36e are as follows:

| REGION | Operating Temperature Range |
| --- | --- |
| 36a | 0° C.–9° C. |
| 36b | 7° C.–16° C. |
| 36c | 14° C.–23° C. |
| 36d | 21° C.–30° C. |
| 36e | 28° C.–37° C. |

The liquid 16 within container 14 is at a temperature of 15° C. In order to determine the level of the interface 20 between the liquid 16 and the void volume 18 above it, a fluidic material which is at a temperature of 50° C. is sprayed onto the outer surface of the level indicator 10. Here, a temperature response is invoked from two regions 36b and 36c. A color change occurs in region 36b which responds to the upper limit of its operating temperature range while a color change also occurs for the adjacent region 36c which responds to the lower limit of its operating temperature range. Due to the overlapping operating temperature ranges of the regions 36, readings of both regions 36b and 36c are necessary to readily discern visually the level of the interface 20.

Figure 11:
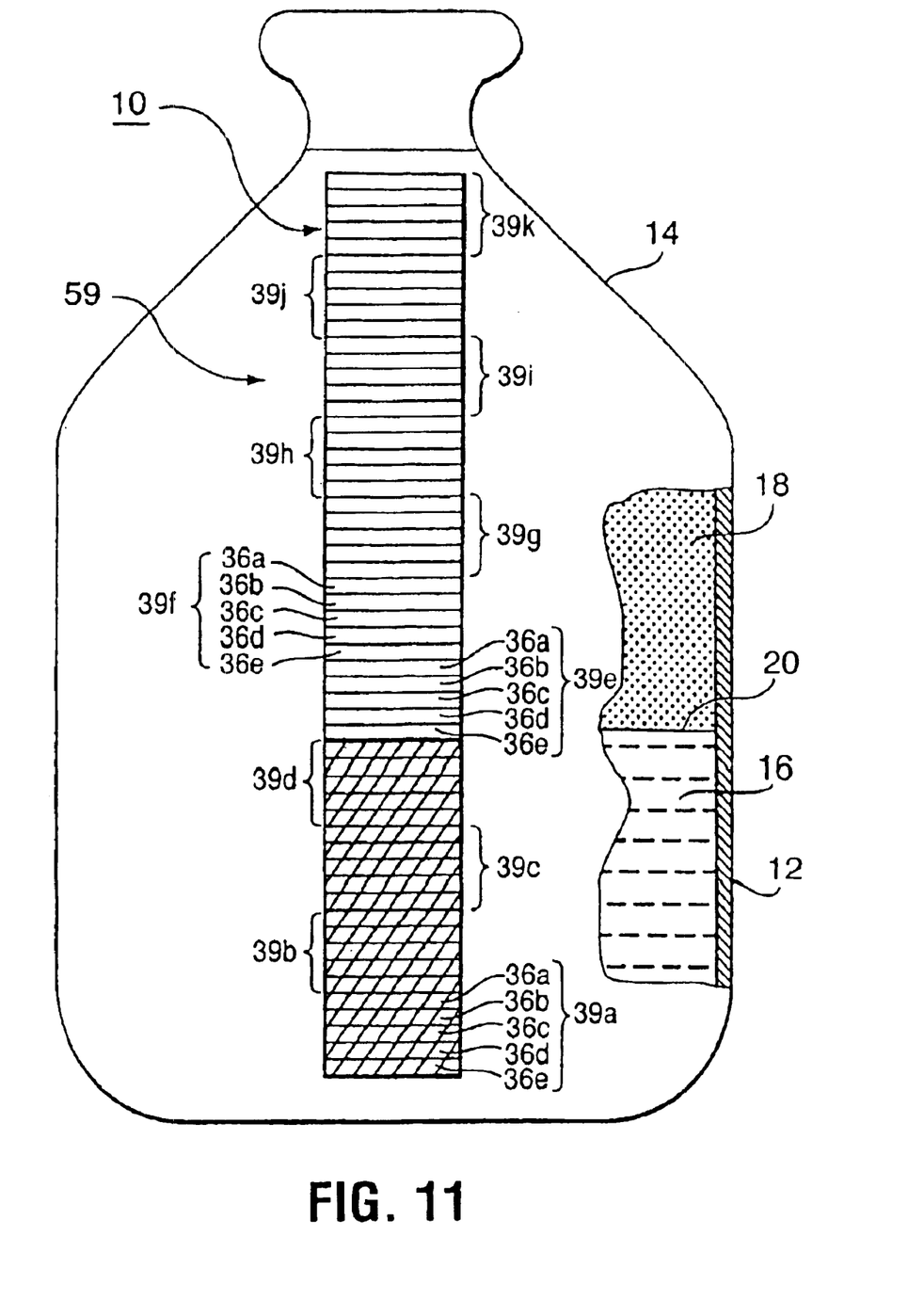
FIG. 11 is a front view of the thermochromic array of a sixth embodiment of the level indicator in keeping with the present invention, when directly applied to the outside surface of the outside wall of the container.

In yet another example, the level indicator 10 is directly applied to the outside surface of the outside wall 12 of a large sealed container 14 which is exposed to the same environment as described above. The level indicator 10 also comprises five regions 36a, 36b, 36c, 36d and 36e which respond to the same operating temperature ranges as illustrated in the above Table. The only exception is that the regions 36a, 36b, 36c, 36d and 36e are arranged in a horizontal manner, as particularly seen in FIG. 11. Furthermore, the five regions 36a, 36b, 36c, 36d and 36e are combined to form a set 39 and a plurality of such a set 39 are disposed along the length of array 59. As shown in FIG. 11, eleven such sets 39a, 39b, 39c, 39d, 39e, 39f, 39g, 39h, 39i, 39j, and 39k are found in array 59 and the liquid 16 is contiguous to sets 39a, 39b, 39c, 39d and 39e. When the fluidic material (50° C.) is sprayed onto the outer surface of the level indicator 10, a temperature response is invoked from the two regions 36b and 36c in each of set 39a, 36a, 36b, 36c, 36d, 39e and 39f. Since the void volume 18 above the liquid 16 generally absorbs or releases far less thermal energy than the liquid 16, a color change in regions 36b and 36c of sets 39a, 39b, 39c, 39d and 39e is more pronounced than in regions 36b and 36c of set 39f. In order to determine the level of the interface 20 between the liquid 16 and the void volume 18 above it within container 14, the method further comprises the step of estimating the level of the interface 20 between the liquid 16 and the void volume 18 above it. The estimated area, in this case, falls between set 39e where the color change is profound and set 39f where the color change is faint.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. A level indicator which is intimately affixed to the outside surface of the outside wall of a container for use in determining the level of the interface between a liquid and the void volume above said liquid within a container;

wherein said liquid has a faster rate of heat transfer than said void volume above it within a container;

said level indicator being in the form of an elongated strip, vertically extending along the height of a container, wherein said level indicator conforms to the contour of the outside surface of the outside wall of a container such that said level indicator is in intimate heat transfer relationship with the outside wall of a container;

wherein said level indicator includes a thermochromic leucodye ink layer, said thermochromic leucodye ink layer having at least one leucodye ink therein;

whereby when said level indicator is in a heat transfer relationship with a heat transfer-inducing agent, said at least one leucodye ink in said level indicator, in the region of the interface between the liquid and the void volume above it within the container and having an operating temperature range encompassing the temperature of the heat transfer-inducing agent, will exhibit a profound color change responsive to heat transfer between the heat transfer-inducing agent and the liquid so as to permit the level of the interface to be detected.

2. The level indicator of claim 1, wherein said thermochromic leucodye ink layer has at least two leucodye inks therein which are different from one another, and said at least two leucodye inks being arranged in at least two regions;

wherein each of said at least two regions of leocodye inks is arranged in an individual area, and each of said leucodye inks responds chromatically within a different operating temperature range; and wherein said regions of said at least two leucodye inks are disposed in arrays thereof arranged along the length of said level indicator;

whereby when said level indicator is in a heat transfer relationship with a heat transfer-inducing agent, at least one of said at least two leucodye inks in said level indicator, in the region of the interface between the liquid and the void volume above it within the container and having an operating temperature range encompassing the temperature of the heat transfer-inducing agent, will exhibit a profound color change responsive to heat transfer between the heat transfer-inducing agent and the liquid so as to permit the level of the interface to be detected.

3. The level indicator of claim 1, wherein said level indicator vertically extends along the height of a container, at least in the region of the top portion of the container, and at least above the legal safe-fill level of said liquid within a container such that overfilling of said liquid in a container is detectable.

4. The level indicator of claim 1, further including a layer of base material which is intimately affixed to the outside wall of a container in such a manner that said layer of base material is in intimate heat transfer relationship with the outside wall of a container, and wherein said thermochromic leucodye ink layer overlies said layer of base material.

5. The level indicator of claim 4, wherein said layer of base material is applied to the outside wall of a container by an application method chosen from the group consisting of permanently securing said base material to the outside surface of the outside wall of a container, and removably securing said base material to the outside surface of the outside wall of a container when said base material additionally has adhesive or magnetic properties so as to permit said level indicator to be repeatedly removed and reattached to the outside wall of a container.

6. The level indicator of claim 2, further including a layer of base material which is intimately affixed to the outside wall of a container in such a manner that said layer of base material is in intimate heat transfer relationship with the outside wall of a container, and wherein said thermochromic leucodye ink layer overlies said layer of base material;

wherein said layer of base material is applied to the outside wall of a container by an application method chosen from the group consisting of permanently securing said base material to the outside surface of the outside wall of a container, and removably securing said base material to the outside surface of the outside wall of a container when said base material additionally has adhesive or magnetic properties so as to permit said level indicator to be repeatedly removed and reattached to the outside wall of a container; and wherein when said layer of base material is directly applied to the outside wall of a container, and said at least two leucodye inks have been applied to said base material by an application method chosen from the group consisting of painting, silk screening, offset lithography, flexography, gravure, stencilling, crayon transfer, pencil transfer, screening, and combinations thereof.

7. The level indicator of claim 4, wherein said base material has a series of indicia printed thereon, and wherein said indicia are vertically positioned along the length of said base material and at predetermined spaced-apart locations.

8. The level indicator of claim 2, further including a layer of base material which is intimately affixed to the outside wall of a container in such a manner that said layer of base material is in intimate heat transfer relationship with the outside wall of a container, and wherein said thermochromic leucodye ink layer overlies said layer of base material;

wherein said base material has a series of indicia printed thereon, and wherein said indicia are vertically positioned along the length of said base material and at predetermined spaced-apart locations; and wherein said indicia on said base material remain invisible until such time when at least a portion of one of said at least two leocodye inks of said thermochromic leucodye ink layer becomes activated, and when activated, said portion of one of said at least two leucodye inks becomes translucent, so as to reveal at least one of said indicia printed on said base material.

9. The level indicator of claim 4, wherein said base material has light absorbing properties.

10. The level indicator of claim 2, wherein said thermochromic leucodye ink layer further includes a light absorbing background upon which said at least two regions of leucodye inks are arranged.

11. The level indicator of claim 2, wherein said at least two leucodye inks are directly applied to the outside surface of the outside wall of a container.

12. The level indicator of claim 11, wherein each of said at least two leucodye inks is directly applied to the outside surface of the outside wall of a container by an application method chosen from the group consisting of painting, silk screening, offset lithography, flexography, gravure, stencilling, crayon transfer, pencil transfer, screening, and combinations thereof, and wherein each of said at least two leucodye inks is carried to the outside surface of the outside wall of a container during the application method by a transfer medium.

13. The level indicator of claim 12, wherein said transfer medium is chosen from the group of formulations consisting of solvent-based, water-based, plastisol, UV formulations, and combinations thereof.

14. The level indicator of claim 12, wherein at least a portion of the outside surface of the outside wall of a container which underlies said level indicator has been treated by an application method chosen from the group consisting of anodizing, anti-oxidizing, rust-proofing, and combinations thereof, so as to provide at least that portion of the outside surface of the outside wall with a light absorbing property, prior to the direct application of said level indicator to the outside surface of the outside wall of a container.

15. The level indicator of claim 1, wherein said level indicator is intimately affixed to the outside surface of the outside wall of a container chosen from the group of containers consisting of pressurized cylinders, open containers, sealed containers, cryogenic flasks, and opaque vessels, for determining the level of the interface between said liquid and said void volume above said liquid within a container to which said level indicator is intimately affixed.

16. The level indicator of claim 1, further including a protective clear lamina, wherein said protective clear lamina overlies said at least one leucodye ink.

17. The level indicator of claim 16, wherein said protective clear lamina is an ultraviolet filter.

18. The level indicator of claim 1, wherein said at least one leucodye ink has previously been combined with standard ink components.

19. The level indicator of claim 2, wherein said at least two leucodye inks in said array have overlapping temperature ranges.

20. The level indicator of claim 2, wherein said regions of leucodye inks are arranged on said outside surface of the outside wall of a container, are chosen from the group of arrays consisting of one of said regions of leucodye ink vertically positioned down the center of said level indicator and at least one other region diagonally positioned on each side of said vertically positioned region of said level indicator, all of said regions of leucodye inks vertically positioned upon said level indicator, and all of said regions of leucodye inks horizontally positioned upon said level indicator.

21. The level indicator of claim 2, wherein said at least two adjacent regions of leucodye inks are arranged to form a set, and wherein said set is disposed vertically along the length of said level indicator in a repeated manner.

22. The level indicator of claim 1, wherein said heat transfer-inducing agent is chosen from the group consisting of hot air, cold air, steam, hot liquid, cold liquid.

23. A method of determining the level of the interface between a liquid and the void volume above said liquid within a container using a level indicator which is intimately affixed to the outside surface of the outside wall of a container;
wherein said liquid has a faster rate of heat transfer than said void volume above it within a container;
said level indicator being in the form of an elongated strip, vertically extending along the height of a container;
wherein said level indicator conforms to the contour of the outside surface of the outside wall of a container such that said level indicator is in intimate heat transfer relationship with the outside wall of a container;
wherein said level indicator includes a thermochromic leucodye ink layer, said thermochromic leucodye ink layer having at least one leucodye ink therein;
said method comprising the steps of:
(i) inducing heat transfer with said heat transfer-inducing agent between said level indicator and the liquid within a container; and (ii) discerning visually a color change in at least one region of an array of said level indicator;
wherein said region which responds chromatically to a temperature change is contiguous to the liquid within a container at the interface between the liquid and the void volume above it within a container;
wherein step (i) is achieved by selecting any one of the steps chosen from the group of steps consisting of:
(a) spraying a fluidic material onto the outer surface of said level indicator;
(b) wetting the outer surface of said level indicator with a moistened cloth or sponge;
(c) pouring a fluidic material down the outer surface of said level indicator;
(d) trickling a fluidic material down the outer surface of said level indicator; and
(e) applying an electrically energized source along the length of said of said level indicator.

24. The method of claim 23, wherein said fluidic material in any of steps (a) through (d) is a heat source, and wherein said fluidic material is at a temperature which is above the temperature of the liquid within the container so as to induce heat transfer from said fluidic material to the liquid within a container.

25. The method of claim 23, wherein said fluidic material in any of steps (a) through (d) is a heat sink; and wherein said fluidic material is at a temperature which is below the temperature of the liquid within a container so as to induce heat transfer to said fluid material from the liquid within a container.

26. The method of claim 23, wherein said thermochromic leucodye ink layer has at least two leucodye inks therein which are different from one another, and said at least two leucodye inks are arranged in at least two regions;
wherein each of said at least two regions of leocodye inks is arranged in an individual area, and each of said leucodye inks responds chromatically within a different operating temperature range; and
wherein said regions of said at least two leucodye inks are disposed in arrays thereof arranged along the length of said level indicator.

27. The method of claim 26, wherein said at least two adjacent regions are arranged to form a set; wherein said set comprises said at least two leucodye inks, and wherein said set is disposed vertically along the length of said level indicator in a repeated manner.

28. The method of claim 27, wherein said plurality of sets are disposed in a repeated manner vertically along the length of said level indicator, and said method further comprises the step of:
(iii) estimating the level of the interface between the liquid and the void volume above the liquid within a container using said level indicator, wherein the estimated area falls between a level having a profound color change and a level having a faint color change.

* * * * *